United States Patent [19]
Redmond

[11] 3,729,059
[45] Apr. 24, 1973

[54] SEAT BELT SAFETY SYSTEM FOR MOTOR VEHICLES

[75] Inventor: Benjamin Redmond, New York, N.Y.

[73] Assignee: Leila R. Chenkin, New York, N.Y.

[22] Filed: Oct. 12, 1971

[21] Appl. No.: 188,392

[52] U.S. Cl..........180/82, 200/61.58 SB, 307/10 SB, 340/52 E
[51] Int. Cl..............................................B60r 21/10
[58] Field of Search......................180/82, 101, 102; 200/61.58 SB, 85; 307/10 SB; 340/52 E

[56] References Cited

UNITED STATES PATENTS 3,126,227  3/1964  Bollinger...............................180/82
3,438,455  4/1969  Redmond...............................180/82

*Primary Examiner*—Leo Friaglia
*Assistant Examiner*—John A. Pekar
*Attorney*—Morgan, Finnegan, Durham & Pine

[57] ABSTRACT

A seat belt safety system for motor vehicles has all of its seat belts as elements of a common electrical circuit operative to control the drive system of the vehicle and to prevent placing the vehicle in motion, while permitting running of the vehicle's engine with the vehicle at rest, unless and until the seat belt in each and every occupied seat of the vehicle, is buckled. To prevent circumvention of this safety feature, as by a passenger buckling the belt before occupying his seat, each seat belt incorporates electro-mechanical means operative to prevent the belt from being buckled unless and until the seat is occupied.

6 Claims, 2 Drawing Figures

Patented April 24, 1973

3,729,059

INVENTOR
BENJAMIN REDMOND
BY
Morgan, Finnegan, Durham & Pine
ATTORNEYS

SEAT BELT SAFETY SYSTEM FOR MOTOR VEHICLES

BACKGROUND OF THE INVENTION

This invention relates generally to seat belt safety systems for motor vehicles and, more particularly, to an improvement in the seat belt safety system disclosed in my U.S. Pat. No. 3,438,455, granted Apr. 15, 1969.

The seat belt safety system of U.S. Pat. No. 3,438,455 automatically includes any occupied seat, whether driver's or passenger's, as a control on the vehicle drive system so that, although the engine may be started, the vehicle cannot be placed in motion unless and until the seat belt of each and every occupied seat is buckled. Moreover, when the vehicle is in motion, unbuckling, intentionally or accidentally, of a seat belt of an occupied seat will, preferably, serve to actuate a suitable indicating device, such, for example, as a light or buzzer so as to warn the driver, but will not otherwise interfere with the vehicle's motion or normal operation of the vehicle by the driver.

It is apparent that, in such a system, a wilful passenger or driver who deliberately does not want to make use of the protection which a seat belt provides, could by-pass the system by buckling his belt before occupying his seat and then sitting on the belt.

In order to make such circumvention more difficult, the present invention incorporates into such a system a means to prevent a seat belt from being buckled unless and until a passenger or the driver has seated himself in the associated seat.

SUMMARY OF INVENTION

In accordance with this invention, all seat belts of a seat belt safety system for motor vehicles are elements of a common electrical circuit operative to control the drive system of the vehicle and to prevent placing the vehicle in motion, while permitting running of the vehicle's engine with the vehicle at rest, unless and until the seat belt of each and every occupied seat of the vehicle is buckled after the occupant has seated himself. To this end, therefore, each seat belt buckle has its female element provided with a releasable closure member which is normally located and maintained in a closed position in which it prevents insertion of the male element of the buckle into the female element unless and until the closure member is released by a passenger or the driver seating himself in the associated seat. The closure member is movable automatically to an open position by solenoid means coupled thereto and incorporated in the female element and in circuit with the common electrical circuit, the solenoid means being electrically energized when a pressure-actuated seat switch in the associated seat is activated by the weight of a passenger or the driver seating himself in the associated seat. Then and only then may the buckle elements be coupled and the vehicle placed in motion.

BRIEF DESCRIPTION OF THE DRAWING

In the accompanying drawing which forms part of the instant specification and is to be read in conjunction therewith and in which like numbers refer to like parts throughout the several views.

DESCRIPTION OF THE PREFERRED EMBODIMENT

Figure 2:
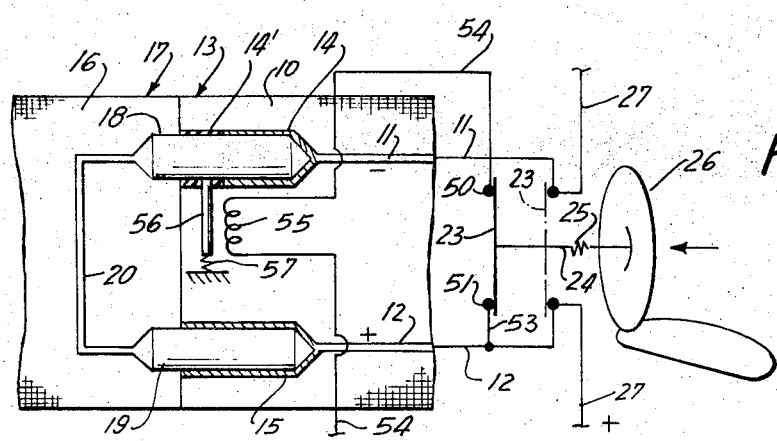
FIG. 2 is a fragmentory diagrammatic view of a seat belt and its schematic electrical connections of the system of FIG. 1.

Referring now more particular to FIG. 2 of the drawing, seat belt section 10 of woven fabric material is provided with a pair of metal electrical conductors 11 and 12 extending lengthwise of the belt section and terminating at the free end 13 of the belt section in a pair of female electrical terminals 14 and 15, respectively. Likewise, the belt section 16, also of woven fabric material, is provided with a pair of male metal electrical terminals 18 and 19 which project outwardly from the free end 17 of the section for a distance sufficient for them to be slidably received and seat in the female terminals 14 and 15, respectively, of the belt section 10. A metal link 20 in the belt section 16 electrically connects the terminal fittings 18 and 19 within the belt section 16 so that a continuous electrical path is provided through the belt sections 10 and 16 when they are coupled as shown, via conductor 11, female terminal 14, male terminal 18, link 20, male terminal 19, female terminal 15 and conductor 12.

Figure 1:
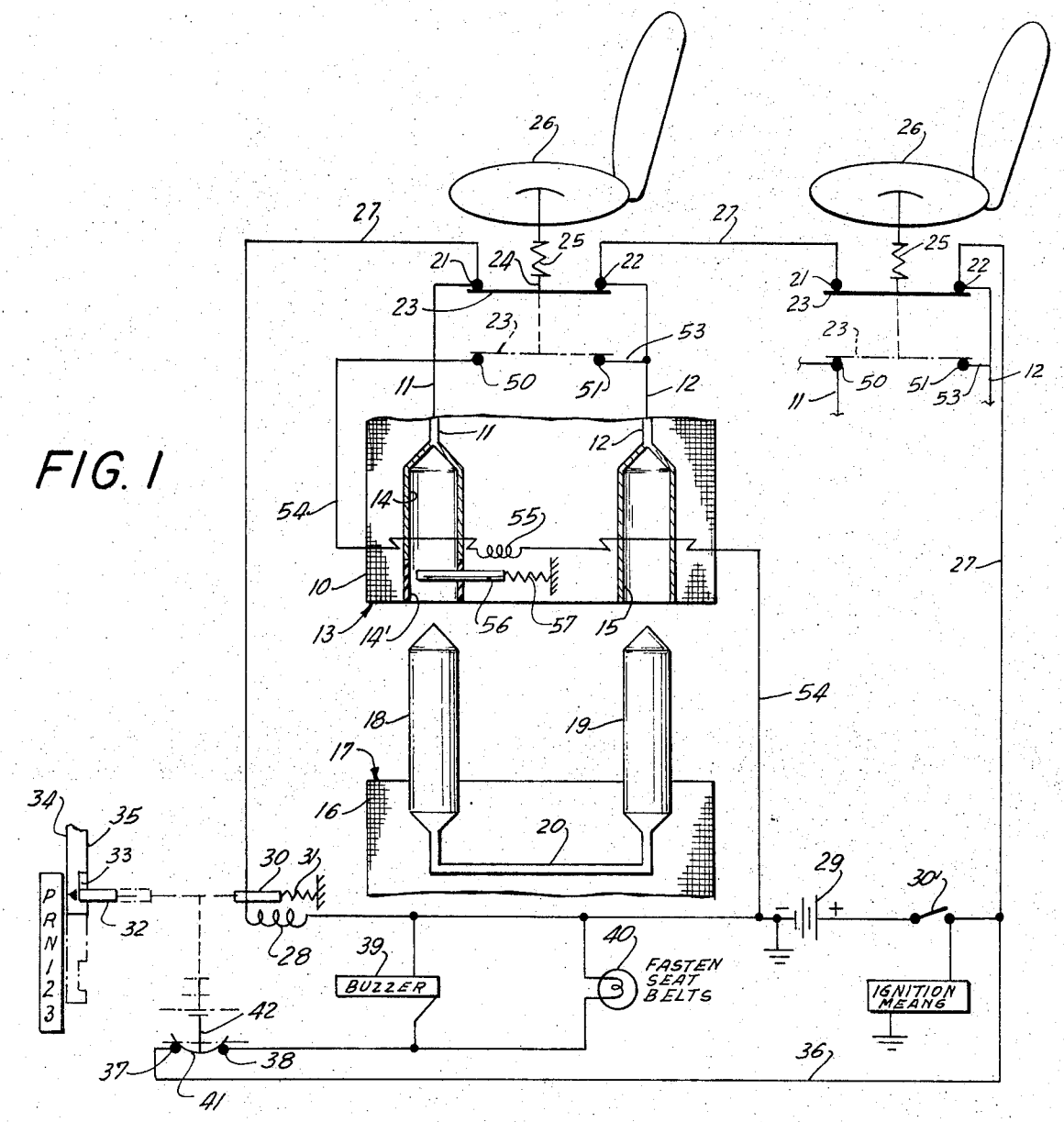
FIG. 1 is a schematic view of a presently preferred embodiment of a safety seat belt system in accordance with this invention.

At least one of the female electrical terminals, the terminal 14 as depicted herein, is preferably formed of electrical insulating material 14' over a portion of its length so that electrical connection between the male terminal 18 and the female terminal 14 cannot be effected until the male terminal is substantially seated in the female terminal. A small solenoid 55 disposed in the female section 10 of the belt has a spring-pressed solenoid plunger 56 mounted transversely of the female terminal 14 for reciprocation between a normally extended position, as shown in FIG. 1, and a retracted position, as shown in FIG. 2. In the retracted position of the plunger 56, the female terminal 14 is open for insertion of the male terminal 18 and completion of the continuous electrical path above described. In its extended position, however, the male terminal 18 is prevented from fully entering the female terminal 14 by the obstructing plunger 56 and, because of the insulating material 14', electrical connection cannot be effected until the plunger is retracted against a spring 57 by energizing of the solenoid 55, all as will be more fully described hereinafter.

It will be understood that the inner or free ends 13 and 17 of the belt sections 10 and 16, respectively, will be provided with suitable known male and female tongue and buckle elements (not shown) for separably connecting the belt sections in known manner and in usual fashion. It will be understood also that the outer ends of the belt sections 10 and 16 will be suitably secured in known manner to the vehicle in association with a seat of the vehicle. Two such seats are indicated in FIG. 1 but it will be understood that a "seat" may be a driver's or a passenger's seat and as many individual "seats" are contemplated as the vehicle permits.

The belt section 10 has its conductors 11 and 12 connected at the end remote from its free end 13 to switch terminals 21 and 22 which are normally connected together electrically by a displaceable switch element 23. The latter is carried adjacent one end of an actuating plunger 24 whose other end is suitably operably connected to the internal spring structure 25 of a seat cushion 26 of the vehicle so that when the seat is occupied the plunger 24 will be displaced downwardly axially against the action of the seat spring structure, thereby causing the switch element 23 also to be displaced downwardly and thus break the circuit between the terminals 21 and 22. It will be observed however that if the belt sections 10 and 16 are connected as is the case when the belt is "buckled", the shunt electrical circuit through the belt formed by the series-connected conducting elements 11, 14, 18, 20, 19, 15 and 12 will maintain a conducting circuit between the terminals 21 and 22.

Each of the pairs of seat switch terminals 21 and 22 is connected in a series electrical circuit 27 which includes a solenoid 28, battery 29 and switch 30' for opening and closing the series circuit. Preferably, the battery 29 is the vehicle battery and the switch 30' the ignition switch or combination ignition-starter switch of the vehicle.

In accordance with this invention also, a second set of normally disconnected switch terminals 50 and 51 are adapted to be connected together electrically by the switch element 23. When the plunger 24 is displaced downwardly axially against the action of the seat spring structure, the switch element 23 will also be displaced downwardly from its solid line position, as shown in FIG. 1 (dash-dot line in FIG. 2), to its dash-dot line position, shown in FIG. 1 (solid line in FIG. 2) and thus close the circuit between the switch terminals 50 and 51. The terminal 50 is connected to one end of a conductor 54 in series with the solenoid 55 which conductor is connected at its other end to the series electrical circuit 27 at a junction between the solenoid 28 and the negative side of the battery 29. The terminal 51 is suitably electrically connected as by conductor 53 to the conductor 12 of the belt section 10. When the terminals 21 and 22 are connected by the switch element 23, there can be no current flow across the switch terminals 50 and 51 through the solenoid 55, and the spring-pressed solenoid plunger 56, extended as shown in FIG. 1, will prevent buckling of the belt section 16 to the belt section 10. On the other hand, upon downward displacement of the switch element 23 into its solid line position bridging the switch terminals 50 and 51 as shown in FIG. 2, resulting from the seat being occupied, current flow across these terminals and through the solenoid 55, will be established and the plunger 56 retracted to its solid line position as shown in FIG. 2, thus permitting buckling of the belt.

The solenoid plunger 30 is spring-pressed axially at one end by means of a spring 31 and carried a detent member 32 which is normally seated by means of the spring in a groove 33 in the gear selector lever 34 of the vehicle transmission. In these circumstances, the lever 34 may be moved between "park" and "neutral" position but not to a vehicle-operating position.

Assuming that the left-hand seat as viewed in FIG. 1 is occupied by the driver and that the right-hand seat in FIG. 1 is vacant, the weight of the driver in the occupied seat moves the switch element 23 associated with the driver's seat down out of contact with the associated terminals 21 and 22 into contact with the switch terminals 50 and 51. The solenoid 55 is energized and the solenoid plunger 56 withdrawn from the female electrical terminal 14, thus permitting the belt to be buckled. Manifestly, if the driver attempts to circumvent this, as by attempting to buckle the belt before occupying the seat, the switch element will remain out of contact with the terminals 50 and 51, and the plunger 56 will continue to obstruct the female electrical terminal 14. Hence, the belt cannot be buckled first and then be placed on the seat to be sat on, or else positioned behind the seat occupant. Thus, every seat which is to be occupied, whether driver's or passenger's, must be occupied before the belt in that seat can be buckled. If the driver's seat belt is not buckled at this time, the conductors 11 and 12 in the driver's seat belt section 10 will not be connected through the link 20 in belt section 16 and an open circuit will exist across terminals 21 and 22 even though ignition switch 30' is "closed." Solenoid 28 will remain unenergized and, although the vehicle engine may be started and run, the vehicle cannot be moved. This may be overcome by the driver buckling his seat belt, thus closing the circuit between terminals 21 and 22 of the driver's seat and energizing solenoid 28. Energizing of solenoid 28 retracts the solenoid plunger 30 against the resistance of the spring 31 and effects withdrawal of the detent 32 from the groove 33 to the dash-dot position shown in FIG. 1. The selector lever 34 may now be moved to the desired operating position as, for example, to the dotted line position shown wherein the indicating arrow would be at 1. In this position, the detent 32 would be opposed by the flat face 35 of the selector lever and, were the solenoid 28 to become de-activated, as would be the case were the driver to unbuckle his seat belt, the detent 32 would merely be pressed against the face 35. Forward movement of the vehicle would not be affected unless and until the selector lever is moved back to the "park" or "neutral" position thus enabling the detent to seat itself in the groove 33.

Assuming however that both the driver's seat and a passenger's seat (the right-hand seat in FIG. 1) were occupied to begin with and that the selector lever 34 were in "park" or "neutral" position, the switch elements 23 associated with both the occupied driver's seat and the occupied passenger's seat would be displaced downwardly away from both sets of contacts 21 and 22. If either the driver's seat belt or the passenger's seat belt is not buckled under these circumstances an open circuit would exist across the set of contacts 21 and 22 of the driver's or passenger's seat as the case may be. Current would not flow in the solenoid circuit and the seated detent 32 would prevent movement of the selector lever 34 to an operating position until the unbuckled seat belt is buckled to close the solenoid circuit. Again, if this is done and the vehicle placed in motion, it may be continued in motion thereafter even if the driver or passenger or both unbuckles his seat belt since the detent 32 would merely be released and come to rest on the selector face 35.

Preferably, however, means are provided for giving an audible or visual indication that a seat belt in an occupied seat is unbuckled. As here preferably embodied, an alarm circuit 36 is provided in parallel with the seat belt circuit 27 and includes a pair of switch-operated terminals 37 and 38 in series with the battery 29, the ignition switch 30' and with a buzzer 39 and a signal light 40 in parallel with each other.

A reciprocable flexible switch member 41 having an axially movable actuating arm 42 secured thereto is mounted to the solenoid plunger 30 so as to be movable out of and into engagement with the terminals 37 and 38. The switch member 41 is preferably an elongated, thin resilient metal strip of electrical conductive material such, for example, as copper. Normally, this member is held in firm engagement with the terminals 37 and 38 by the solenoid plunger 30 under the action of the solenoid spring 31. In its engaged position and by reason of its flexibility it is deformed from its normal planar configuration and assumes an arcuate shape, as depicted by the solid line position thereof in FIG. 1. When fully retracted by the plunger 30 to the dot-dash line position shown in FIG. 1, it is restored to its normal planar configuration and is wholly separated from the terminals 37 and 38 and the alarm circuit 36 is "open." In an intermediate position indicated by the dash lines in FIG. 1, it merely rests upon the terminals 37 and 38 with sufficient pressure to maintain the circuit closed between these terminals.

As has been noted above, when the vehicle is in motion and the belt circuit 27 is broken by the unbuckling of a belt in an occupied seat, the detent 32 is urged by the spring-pressed plunger 30 against the face 35 of the selector lever 34. This position of the plunger 30 corresponds to the above-noted intermediate position (dash line position) of the switch member 42. In this position the alarm circuit is closed and an unbuckled seat belt will be indicated automatically to the driver audibly by a buzzer 39 and visually by the signal light 40.

In the foregoing description of the preferred embodiment of this invention and in the interest of simplicity, only one of the two seats 26 and its associated seat belt is depicted in FIG. 1 as being provided with the seat-actuated solenoid mechanism operative to control buckling of the seat belt. It will be understood, however, that, preferably, all of the seats are to be so equipped and, further, that the mechanism depicted in association with the left-hand seat in FIG. 1, is equally applicable to all of the seats of the vehicle.

Having thus described my invention, what I claim is:

1. In a safety seat belt system for use with a motor vehicle having safety seat belt means for releasably securing an occupant of the vehicle to a seat of the vehicle, said safety seat belt means including a pair of separable seat belt sections adapted to be releasably connected together and providing an electrical circuit through the pair when connected, the improvement comprising:

switch means associated with said seat and responsive to the weight of the seat occupant so as to be open when the seat is unoccupied and closed when the seat is occupied; and, normally de-energized solenoid means connected electrically with said switch means, said solenoid means being energized upon closure of said switch means and being mounted to one section of said pair and having closure means movable in response to energizing of said solenoid means between a first position in which said closure means is interposed between the connectable ends of said pair so as to prevent connection of said sections and a second position in which said closure means is withdrawn from between said ends so as to permit their connection and provide said electrical circuit.

2. In a safety seat belt system in accordance with claim 1 wherein said electrical circuit comprises a pair of male electrical terminals extending from the connectable end of one section of said pair of separable seat belt sections and a pair of female electrical terminals in the connectable end of the other section of said pair for receiving said male terminals, and wherein said closure means comprises a solenoid plunger in said other section traversing at least one of said female electrical terminals adjacent the free end of said other section so as normally to prevent entry of said male terminals, said plunger being retractable from said one terminal in response to energizing of said solenoid means to clear said terminal for entry of said male terminals.

3. In a safety seat belt system in accordance with claim 2 wherein at least one of said terminals is electrically insulated at its free end.

4. In a safety seat belt system in accordance with claim 3 wherein the insulated terminal is a female terminal.

5. In a safety seat belt system for use with a motor vehicle having safety seat belt means for releasably securing the operator to the driver's seat and at least one other safety seat belt means for releasably securing a passenger to a passenger's seat, said safety seat belt means each including a pair of separable seat belt sections adapted to be releasably connected together and providing an electrical circuit through the pair when connected, the improvement comprising:

switch means associated with the driver's seat and other switch means associated with said passenger seat, each said switch means being responsive to the weight of the seat occupant so as to be open when the seat is unoccupied and closed when the seat is occupied; and, individual normally de-energized solenoid means individually connected electrically with the respective switch means, the respective solenoid means being energized upon closure of the associated switch means and being mounted one and the same section of the pair of separable seat belt sections of the associated safety seat belt means, each said solenoid means having closure means movable in response to energizing of the solenoid means between a first position in which said closure means is interposed between the connectable ends of said pair so as to prevent connection of said sections and a second position in which said closure means is withdrawn from between said ends so as to permit their connection and provide said electrical circuit.

6. In a safety seat belt system for use with a motor vehicle having an engine ignition system, drive train means including control means therefor shiftable between an engine starting position and at least one drive position, for transmitting power from the vehicle engine to the vehicle drive wheels, safety seat belt means for releasably securing the operator to the driver's seat of the vehicle and at least one other safety seat belt means for releasably securing a passenger to a passenger's seat of the vehicle, said safety seat belt means each including a pair of separable seat belt sections, the sections of each pair being adapted to be releasably connected together and providing an electrical circuit through at least one section of the pair when connected, and means normally locking said control means in the engine starting position, the improvement comprising:

switch means associated with the driver's seat and and other switch means associated with said passenger seat, each said switch means comprising a first terminal means, a second terminal means and a switch element movable from one to the other of said terminal means, said switch element being responsive to the weight of the seat occupant so as to be in contact with said first terminal means when the associated seat is unoccupied and in contact with said second terminal means when the associated seat is occupied;

normally de-energized first solenoid means in electrical circuit with the engine ignition system, with each of said first terminal means and with the electrical circuits of said seat belt sections, said first solenoid means being only operable in response to the connection of all of the seat belt sections of the occupied seats for releasing said locking means when the seat belt sections of all of the occupied seats are connected, whereby said control means may be shifted from an engine starting position to a drive position;

individual normally de-energized second solenoid means individually connected electrically with the respective second terminal means, the respective second solenoid means being energized upon contact of the associated switch element with the associated second terminal means and being mounted on one and the same section of the pair of separable seat belt sections of the associated safety seat belt means, each said second solenoid means having closure means movable in response to energizing of the second solenoid means between a first position in which said closure means is interposed between the connectable ends of said pair so as to prevent connection of said sections and a second position in which said closure means is withdrawn from between said ends so as to permit their connection and provide said electrical circuit.

* * * * *